(12) United States Patent
Martinelli et al.

(10) Patent No.: US 10,737,739 B2
(45) Date of Patent: Aug. 11, 2020

(54) SELF-BALANCING SCOOTER OR PERSONAL TRANSPORTER

(71) Applicant: UNIVERSITE PARIS SUD, Orsay (FR)

(72) Inventors: Pascal Martinelli, Bourg-la-Reine (FR); Gilles Raynaud, Bures-sur-Yvette (FR)

(73) Assignee: UNIVERSITE PARIS SUD, Orsay (FR)

( * ) Notice: Subject to any disclaimer, the term of this patent is extended or adjusted under 35 U.S.C. 154(b) by 0 days.

(21) Appl. No.: 15/780,784

(22) PCT Filed: Dec. 12, 2016

(86) PCT No.: PCT/EP2016/080653
§ 371 (c)(1),
(2) Date: Jun. 1, 2018

(87) PCT Pub. No.: WO2017/108481
PCT Pub. Date: Jun. 29, 2017

(65) Prior Publication Data
US 2019/0291806 A1 Sep. 26, 2019

(30) Foreign Application Priority Data

Dec. 21, 2015 (FR) ..................................... 15 62938

(51) Int. Cl.
*B62K 11/00* (2006.01)
*B62K 11/14* (2006.01)
(Continued)

(52) U.S. Cl.
CPC .............. *B62K 11/007* (2016.11); *B60K 1/04* (2013.01); *B62K 11/14* (2013.01);
(Continued)

(58) Field of Classification Search
CPC ..................................................... B62K 11/007
See application file for complete search history.

(56) References Cited

U.S. PATENT DOCUMENTS 9,604,692 B1 * 3/2017 Kim ........................ B62K 23/08
9,896,146 B2 * 2/2018 Lu ............................. B60K 1/04
(Continued)

FOREIGN PATENT DOCUMENTS

| CN | 101074039 A | 11/2007 |
|----|-------------|---------|
| CN | 206954391 U * | 2/2018 |

(Continued)

OTHER PUBLICATIONS

International Search Report of PCT/EP2016/080653 dated Apr. 6, 2017.

*Primary Examiner* — Kevin Hurley
(74) *Attorney, Agent, or Firm* — Sughrue Mion, PLLC

(57) ABSTRACT

A self-balancing scooter having a platform that includes a footstep, two wheels, and a gyroscopic stabilizing element that acts on wheel driving motors in such a way as to ensure that the self-balancing scooter is balanced and moves. The self-balancing scooter has a housing which accommodates a battery supplying power to the motors and is closed by a lid, the housing being removably accommodated on the platform of the self-balancing scooter such that the lid forms a footstep of the self-balancing scooter.

12 Claims, 4 Drawing Sheets

(51) Int. Cl.
*B60K 1/04* (2019.01)
*B62M 6/90* (2010.01)
*B62J 43/00* (2020.01)

(52) U.S. Cl.
CPC ... *B60K 2001/0438* (2013.01); *B60Y 2200/13* (2013.01); *B60Y 2200/81* (2013.01); *B62J 43/00* (2020.02); *B62K 2202/00* (2013.01); *B62K 2204/00* (2013.01); *B62M 6/90* (2013.01)

(56) References Cited

U.S. PATENT DOCUMENTS

| | | | |
|---|---|---|---|
| 10,167,038 B2 * | 1/2019 | Kim | ..................... B62K 11/007 |
| 2013/0238231 A1 | 9/2013 | Chen | |
| 2014/0131126 A1 | 5/2014 | Martinelli et al. | |
| 2015/0096820 A1 | 4/2015 | Strack | |
| 2016/0129963 A1 | 5/2016 | Ying et al. | |
| 2018/0148120 A1 * | 5/2018 | Yang | ........................ B62K 1/00 |

FOREIGN PATENT DOCUMENTS

| | | | |
|---|---|---|---|
| FR | 2 976 548 A1 | 12/2012 | |
| JP | 2005094898 A * | 4/2005 | ........... B62K 11/007 |
| WO | 2012/171821 A1 | 12/2012 | |
| WO | 2015/121754 A2 | 8/2015 | |
| WO | 2015/188599 A1 | 12/2015 | |

* cited by examiner

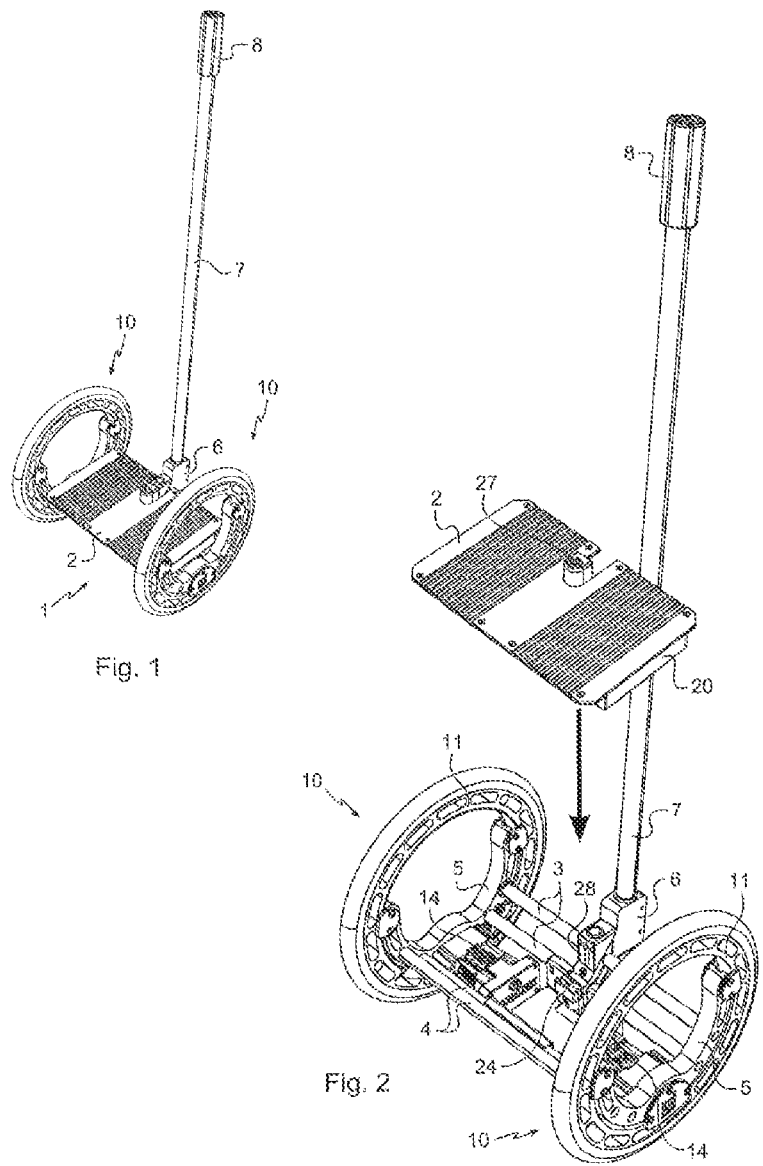

SELF-BALANCING SCOOTER OR PERSONAL TRANSPORTER

CROSS REFERENCE TO RELATED APPLICATIONS

This application is a National Stage of International Application No. PCT/EP2016/080653 filed Dec. 12, 2016, claiming priority based on French Patent Application No. 15 62938 filed Dec. 21, 2015.

TECHNOLOGICAL BACKGROUND OF THE INVENTION

A gyropod is known, from the document FR 2 976 548, that comprises a platform flanked by two wheels and provided with a holding and driving stick, as well as a gyroscopic stabilizing member acting on wheel driving motors to ensure the balance and the movement of the gyropod. Each of the wheels comprises a rim which cooperates with bearings borne by respective crescent-shaped supports which each extend essentially facing the associated rim and which bear the associated driving motor such that the latter drives the associated wheel by acting on the rim, the supports being fixed on to the sides of the platform. Thus, each driving motor can cooperate directly (by friction or by gear-meshing) with the rim of the associated wheel, which naturally offers a great reduction ratio that makes it possible to save on a reducing gear. In the gyropod illustrated in this document, the platform comprises a footrest borne by crossmembers which extend between the supports by being fixed thereto. It is specified that a battery pack is borne by these crossmembers to power the motors.

Also known from the document WO 2015/121754 is an electric monocycle. Said monocycle comprises a fixed footrest that has recesses for receiving battery packs.

OBJECT OF THE INVENTION

The invention aims to further simplify the design of a self balancing human transporter and improve the ease of use.

SUMMARY OF THE INVENTION

In order to achieve this aim, a self balancing human transporter is proposed that comprises a platform, two lateral wheels, and a gyroscopic stabilizing device acting on wheel driving motors. According to the invention, the self balancing human transporter comprises a housing receiving a battery powering the motors and closed by a lid, the housing being removably received on the platform of the self balancing human transporter such that the lid forms a footrest of the self balancing human transporter on which the user stands when in service.

Thus, the housing fulfills a dual function of storage of the battery and of footrest, and can be easily removed for recharging, another housing containing a charged battery being able to be adapted to the self balancing human transporter instead of the removed housing. The housings can be stored and charged, for example on supports fixed to the walls.

In this way, the housing as a whole, and therefore the lid included therein, is removable from the rest of the platform which very easily makes it possible to change the power supply battery. In particular, the lid of the housing on its own forms the footrest of the self balancing human transporter and comes with the rest of the housing when the latter is removed from the platform.

In the document FR 2 976 548, only a fixed footrest is covered. Similarly, in the document WO 2015/121754, the footrest is fixed and only the battery packs can be removed from the platform, and one by one only.

By contrast, in the invention, the housing fulfills a dual function of storage of the battery and of footrest and can be removed in one piece, which obviously results in the removal of the footrest as a whole.

According to a particular embodiment, each of the wheels of the self balancing human transporter comprises a rim which cooperates with bearings borne by respective crescent-shaped supports which each extend essentially facing the associated rim and which bear the associated driving motor such that the latter drives the associated wheel by acting on the rim, the supports extending on the sides of the platform and being linked to one another by crossmembers which bear the housing.

DESCRIPTION OF THE FIGURES

The invention will be better understood in light of the following description of a particular embodiment of the invention, with reference to the figures of the attached drawings, in which:

FIG. 1 is a perspective view of a self balancing human transporter according to a particular embodiment of the invention, FIG. 2 is a view similar to that of FIG. 1, the housing being put in place;

DETAILED DESCRIPTION OF A PARTICULAR EMBODIMENT

Figure 3:
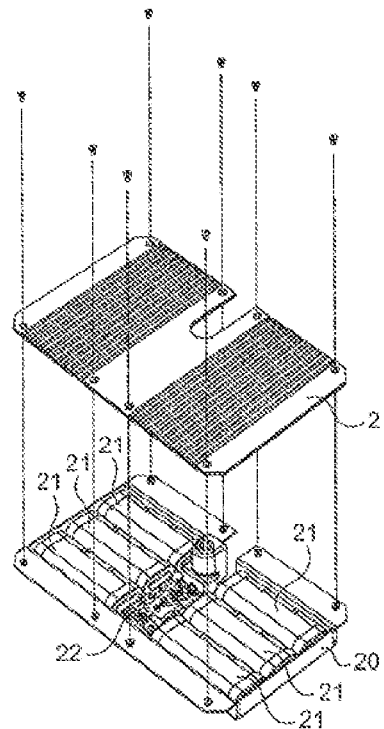
FIG. 3 is an exploded perspective views of the housing of FIG. 2.
Figure 5:
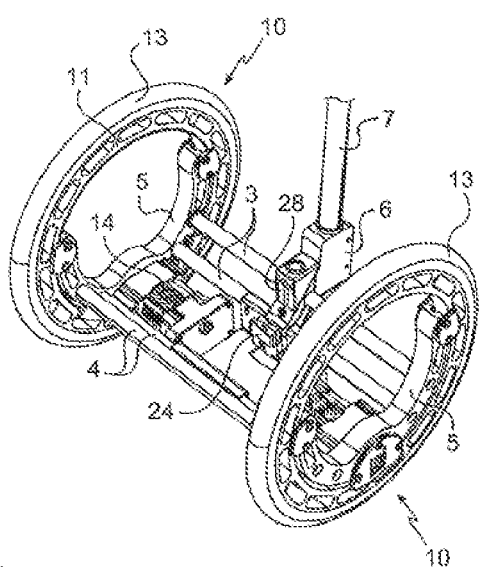
FIG. 5 is a perspective view from above of the self balancing human transporter of FIG. 1, without the housing.
Figure 6:
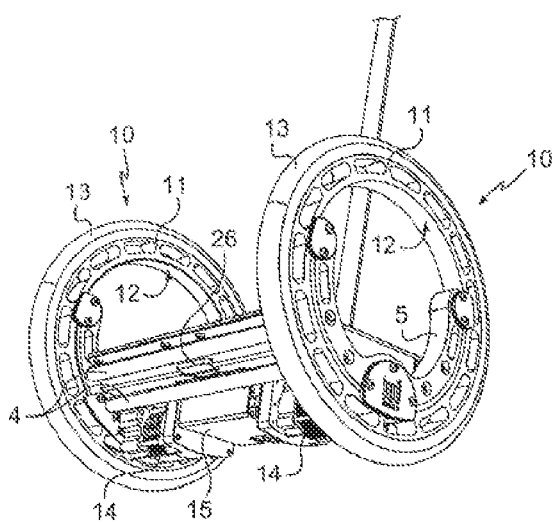
FIG. 6 is a perspective view from below of the self balancing human transporter of FIG. 1, with the housing.

The invention is described here in its application to a self balancing human transporter of the type of that illustrated in the document FR 2 976 548. It is however obvious that the invention applies to other types of two-wheeled personal transporter of more conventional structure.

Referring to the figures, the self balancing human transporter of the invention comprises a platform 1 comprising a footrest 2. The footrest 2 rests on a structure comprising two rear crossmembers 3 and two front crossmembers 4 which extend between crescent-shaped supports 5 by being fixed by their ends (for example by fitting on to the latter). The rear crossmembers 3 bear an anchor point 6 suitable for receiving a holding and driving stick 7 terminated by a handle 8. The assembly formed by the crossmembers 3, 4 and the supports 5 forms a rigid structure. In particular, the anchor point 6 can be designed to be clamped on to the two rear crossmembers 3, which greatly limit the twisting of the structure. The wheels 10 each comprise a rim 11 bearing on the outside a rolling member 13 (for example a tire or a solid elastomer roll) and bear on the inside a bearing surface 12 (for example an elastomer strip) which is, here, received in an internal track of the rim. Each of the wheels 10 is added to the corresponding support 5 in such a way that the bearing surface 12 extends facing an outer face of the support 5. The latter is generally crescent-shaped and bears four bearings, here plain bearings which extend protruding from the outer face of the associated support 5 in order to, here, cooperate with the inner face of the rim and its sides to guide it in rotation on the support 5. The rotation driving of the wheels is done by motors 14 borne by the supports 5. The motors 14 each comprise an output shaft which here bears a roller (not visible here) cooperating directly by friction with the bearing surface 12. The reduction ratio is naturally significant, which avoids any recourse to a reducing gear. Most of the weight of the platform 1 and of the passenger is transmitted to the wheels 10 by the rollers, thus ensuring that the latter bear against the bearing surface 12 specifically to guarantee a good transmission of the power of the motor. The self balancing human transporter comprises an electronic housing 15 for managing the motors and stabilizing the self balancing human transporter arranged between the motors.

Figure 4A:
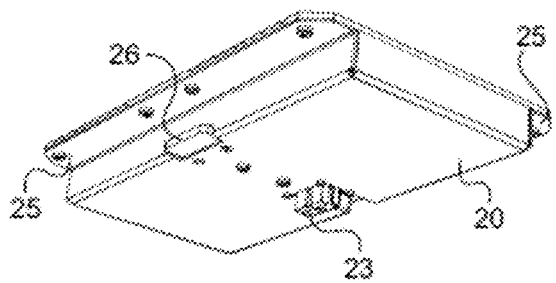
FIGS. 4*a* and 4*b* are perspective views of the housing of FIG. 2.
Figure 4B:
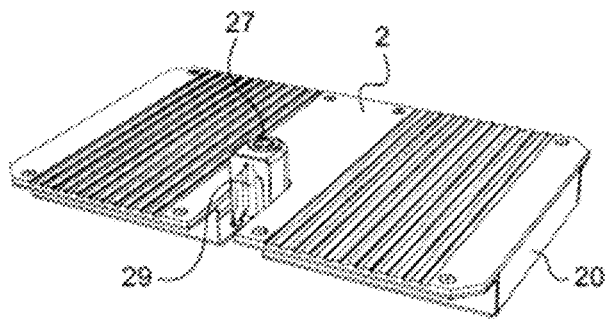

According to the invention, the footrest 2 of the platform 1 is the lid of a housing 20 enclosing a battery (here comprising six storage batteries 21, each composed of 6 cells) linked to a central board 22 which is itself linked to a connector 23 (visible in FIG. 4) intended to cooperate with a conformal connector 24 borne by a connection housing 28 attached to the anchor point 6 when the housing is in place on the self balancing human transporter, and by which the electronic housing 15 and the motors 14 are powered. A connector 27 emerging on the top of the housing 20 and accessible when the housing 20 is in place on the self balancing human transporter allows an external charger to be connected to recharge the storage batteries 21.

The housing 20 here has a parallelepipedal box form and is for example produced in folded sheet steel. It here comprises two horizontal flats 25 extending along its large sides on to which the footrest 2 is here screwed to form a lid of the housing 20. When the housing is put in place on the self balancing human transporter, a tab 26, situated at the base of the housing 20 at the center of one of the large sides under one of the flats, comes to be placed under the top front crossmember 4, then, by a rotary movement about said crossmember, the housing comes to be pressed against the top rear crossmember 3, engaging the connector 23 in the connector 24. The electrical connection of the batteries with the electrical circuit of the self balancing human transporter is thus automatically ensured when the housing 20 is put in place.

It will thus be noted that the footrest 2 as a whole is formed by just the lid of the housing 20 and that the removal or the putting in place of the housing 20 correspondingly results in the removal or the putting in place of the lid and therefore of all the footrest 2.

Figure 7:
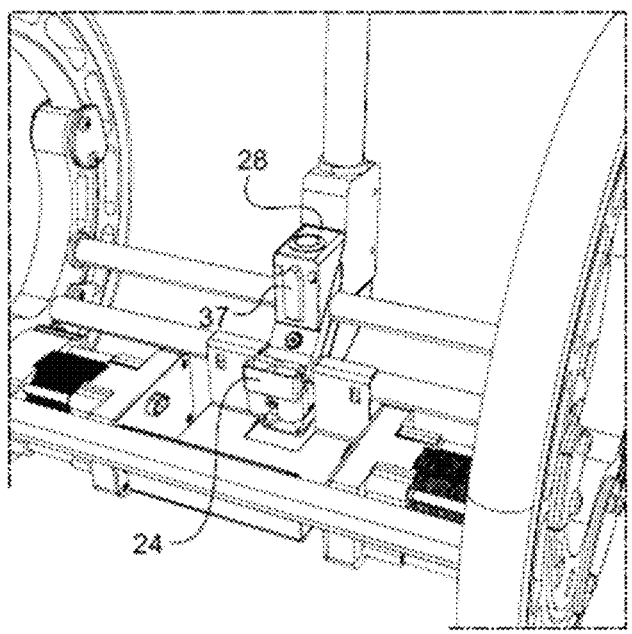
FIG. 7 is an enlarged perspective view of the self balancing human transporter, without the housing.

The housing 20 thus rests by its two flats 25 on the top crossmembers, and any lateral movement is prevented by cooperation of the flanks of a notch 29 (visible in FIG. 4b) produced in the case in receiving the connector 27 with the flanks of a boss 37 visible in the FIG. 7 produced on the face facing the connection housing 28.

Figure 8:
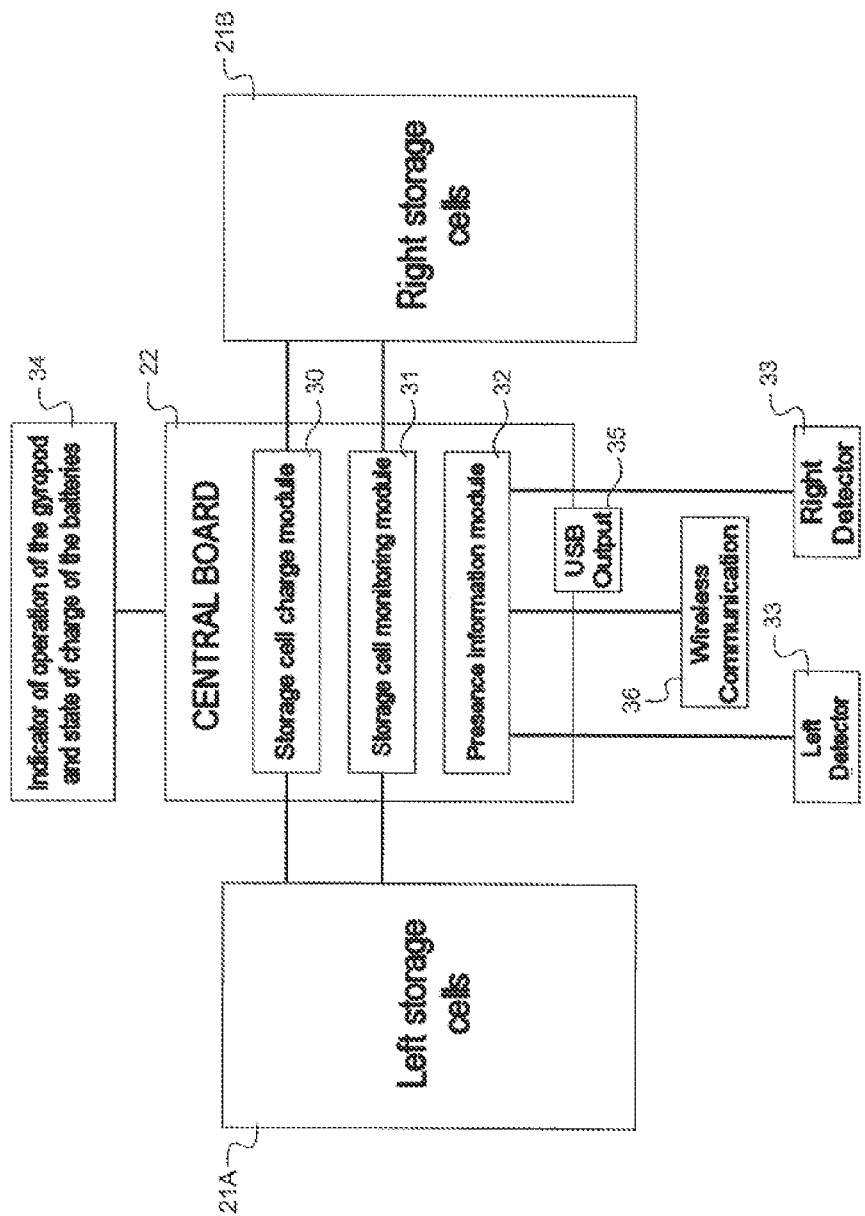
FIG. 8 is a block diagram of a housing according to the invention.

As illustrated in FIG. 8, the housing 20 encloses the battery whose storage batteries 21 are allocated into a left group 21A and a right group 21B.

The two groups 21A, 21B are linked to the central board 22 which bears a module 30 for charging the storage batteries which manages the charge thereof when the housing 20 is linked to an external charger by the connector 27. The central board 22 also bears a module 31 for monitoring the storage batteries that permanently monitors their level of charge and their temperature to detect any failure of one of the storage batteries. The central board 22 also comprises a presence information module 32 suitable for receiving and processing the signals from two detectors 33 placed directly under the footrest to detect whether anyone is standing on the footrest and in response to allow the powering of the motors by the storage batteries. The central board 22 also comprises a USB output 35. It is associated with a wireless communication module 36 for communicating with the other electronic boards embedded on the self balancing human transporter, or with a return station. The central board 22 manages an indicator of operation and of the state of charge of the batteries 34, which can take the form of an LED display that can be seen by the user when in service.

The invention is not limited to what has just been described, but on the contrary encompasses any variant falling within the scope defined by the claims.

In particular, although, here, the housing which encloses the battery is received on crossmembers, it will more generally be possible to provide any structure making it possible to receive a housing enclosing the batteries and whose lid forms a footrest of the self balancing human transporter. The housing will be able to be produced in folded sheet steel as here, or by any other method, such as thermoforming or plastic injection. The footrest will be able to be screwed, clipped, glued, etc. Furthermore, the wheels of the self balancing human transporter will, as illustrated here, be able to be arranged on the flanks of the platform, but will also be able to be arranged under the platform, being driven directly, as here, by a roller cooperating with the rim of the wheel, or by their hub via a reducing gear, as on other known self balancing human transporter. Finally, although the central board 22 of the housing 20 comprises modules for charging and monitoring the storage batteries of the battery pack, and a presence information module, it will be possible to add other molds or electronic members thereto, such as the gyroscopic stabilizing member, a GPS module, a trip memorizing module or a self-steering module.

The invention claimed is:

1. A self balancing human transporter comprising a platform, two lateral wheels and a gyroscopic stabilizing member acting on wheel-driving motors to ensure the balance and the movement of the self balancing human transporter, wherein the self balancing human transporter comprises a housing receiving a battery powering the motors and closed by a lid, the housing being removably received on the platform of the self balancing human transporter such that the lid forms a footrest of the self balancing human transporter on which the user climbs when in service, wherein the housing comprises a connector that cooperates with a conformal connector borne by the platform and by which the motors are powered when the housing is placed on the self balancing human transporter.

2. The self balancing human transporter as claimed in claim 1, in which each of the wheels comprises a rim which cooperates with bearings borne by crescent-shaped respective supports which each extend essentially facing the associated rim and which the associated driving motor such that the latter drives the associated wheel by acting on the rim, the supports extending on the sides of the platform and being linked to one another by crossmembers which bear the housing.

3. The self balancing human transporter as claimed in claim 2, in which the housing comprises two flats along its large sides which rest in service on the crossmembers.

4. The self balancing human transporter as claimed in claim 3, in which the housing comprises a tab at the base of the housing, under one of the flats, intended to be inserted under one of the crossmembers.

5. The self balancing human transporter as claimed in claim 1, in which the housing comprises a module for managing the charge of storage cells of the battery.

6. The self balancing human transporter as claimed in claim 1, in which the housing comprises a module for monitoring storage cells of the battery.

7. The self balancing human transporter as claimed in claim 1, in which the housing comprises a presence information module collaborating with two detectors to detect the presence of a user standing on the footrest and in response authorizes the powering of the motors by the battery.

8. A self balancing human transporter comprising a platform (1), two lateral wheels (10) and a gyroscopic stabilizing member (15) acting on wheel-driving motors (14) to ensure the balance and the movement of the self balancing human transporter, wherein the self balancing human transporter comprises a housing (20) receiving a battery (21) powering the motors and closed by a lid, the housing being removably received on the platform of the self balancing human transporter such that the lid forms a footrest (2) of the self balancing human transporter on which the user climbs when in service, in which the housing (20) comprises a connector (23) which cooperates with a conformal connector (24) borne by the platform (1) and by which the motors (14) are powered when the housing is placed on the self balancing human transporter.

9. A self balancing human transporter comprising a platform (1), two lateral wheels (10) and a gyroscopic stabilizing member (15) acting on wheel-driving motors (14) to ensure the balance and the movement of the self balancing human transporter, wherein the self balancing transporter comprises a housing (20) containing a battery (21) powering the motors, the battery being arranged inside the housing, the housing having an opening at a top of the housing for receiving the battery, and the opening being closed by a lid, the housing being removably received on the platform of the self balancing human transporter such that the lid forms a footrest (2) of the self balancing human transporter on which the user climbs when in service; and wherein the housing comprises a connector which cooperates with a conformal connector borne by the platform and by which the motors are powered when the housing is placed on the self balancing human transporter.

10. The self balancing human transporter as claimed in claim 9, further comprising crossmembers extending between the two later wheels, and wherein the housing, together with the battery and the lid is supported as an integral unit on the crossmembers.

11. The self balancing human transporter as claimed in claim 9, wherein the housing, together with the battery and the lid, is removable as an integral unit for recharging and replacement in the self balancing human transporter by another housing containing a charged battery and a lid that closes the another housing and that has an outside surface that forms a footrest.

12. A self balancing human transporter comprising:
a platform (1);
two lateral wheels (10);
a gyroscopic stabilizing member (15) acting on wheel-driving motors (14) to ensure the balance and the movement of the self balancing human transporter; and
a housing (20) containing a battery (21) powering the motors and closed by a lid, the housing being removably received on the platform of the self balancing human transporter such that the lid forms a footrest (2) of the self balancing human transporter on which the user climbs when in service;
the housing defining closed space within which said battery is arranged, said closed space being closed by the lid forming the footrest; and
wherein the housing comprises a connector which cooperates with a conformal connector borne by the platform and by which the motors are powered when the housing is placed on the self balancing human transporter.

* * * * *